May 25, 1937.　　　　　　　I. RAFFELSON　　　　　　　2,081,281
LICENCE PLATE CASING AND ILLUMINATOR
Filed Nov. 15, 1934　　　2 Sheets-Sheet 1
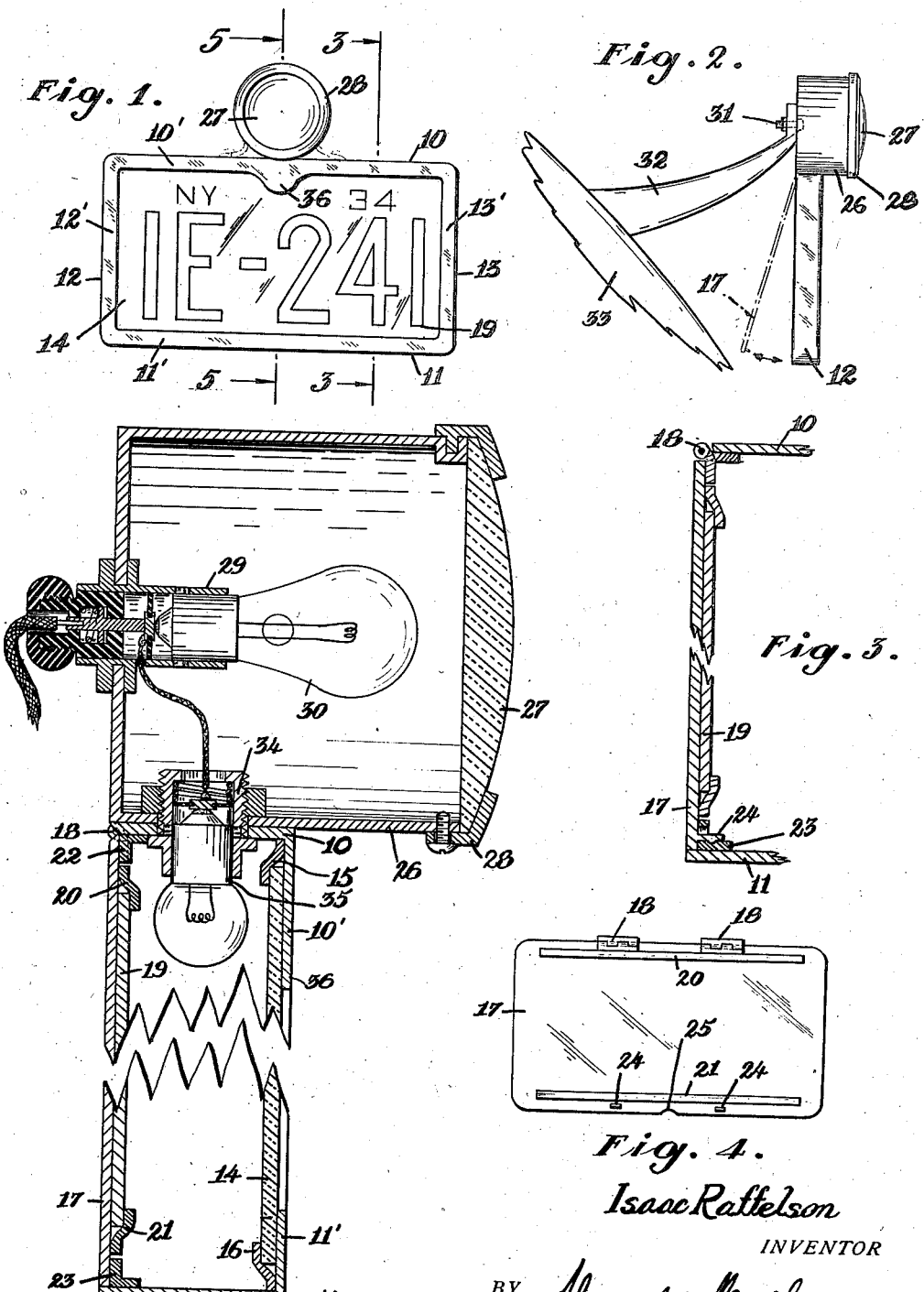
Isaac Raffelson
INVENTOR
BY Alexander Bleucher
ATTORNEY May 25, 1937.  I. RAFFELSON  2,081,281

LICENCE PLATE CASING AND ILLUMINATOR

Filed Nov. 15, 1934  2 Sheets-Sheet 2

Isaac Raffelson
INVENTOR

BY Alexander Meucher
ATTORNEY

Patented May 25, 1937

2,081,281

UNITED STATES PATENT OFFICE 2,081,281

LICENSE PLATE CASING AND ILLUMINATOR

Isaac Raffelson, New York, N. Y.

Application November 15, 1934, Serial No. 753,169

1 Claim. (Cl. 40—132)

This invention relates generally to license plate enclosures, and more specifically to a license plate enclosure associated with an automobile taillight.

The main object of the invention is the provision of structure wherein the chamber of the taillight and the enclosure for an automobile license plate both contain sources of illumination, the said sources being electrically connected within the taillight chamber.

Another object of the invention resides in the provision of structure whereby the enclosure for an automobile lincense plate is affixed to the taillight enclosure or chamber and whereby the source of illumination for the license plate enclosure is mounted within the chamber of the taillight.

A further and important object of the invention is the provision of a license plate enclosure with means therein of completely illuminating the license number and protecting the same against weather elements such as rain, mud, frost, dust which latter affect the ease of reading the license plate at night. Another end of the invention is the provision of a transparent and easily washable front wall member of the license plate container which is more easily susceptible of cleaning, dusting and spraying than the metallic license plate itself.

These objects and other incidental ends and advantages of the invention will hereinafter appear in the progress of the disclosure and as pointed out in the appended claim.

In the accompanying drawings showing one of the preferred forms of the invention, corresponding reference characters designate corresponding parts throughout the several views.

In accordance with the drawings showing two forms of the invention,

Figure 1 is a rear view in elevation showing an automobile license plate enclosure with a taillight enclosure mounted thereabove.

Figure 2 is an end elevational view of Figure 1 showing the taillight enclosure affixed to a bracket extending off a rear mud-guard.

Figure 3 is a broken-away sectional view of Figure 1 along the plane 3—3 thereof showing the rear plate of the license plate enclosure as associated with the several elements thereof.

Figure 4 is a front elevational view of the inner face of the said rear plate.

Figure 5 is a sectional view of Figure 1 along the plane 5—5 thereof.

Figure 6:
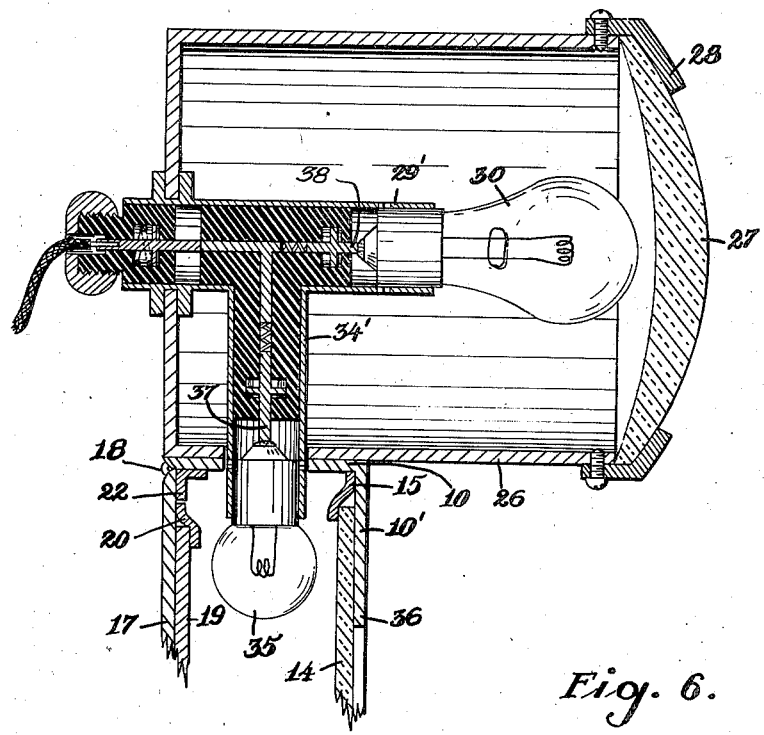
Figure 6 is a view that is similar to Figure 5 except that an improved socket member is associated therewith.

In accordance with the invention and the preferred embodiments thereof shown in the above-described views, the license plate enclosure comprises upper and lower walls 10 and 11 and end walls 12 and 13. Depending from the forward edges of the said walls are inwardly turned flanges 10', 11', 12' and 13' respectively, the said flanges serving to form a continuous frame work for the mounting of a front panel 14 against the inner surface thereof. Front panel 14 is preferably made of a transparent material such as glass or composition and is preferably air-tightly secured against the frame work by two pairs of brackets 15 and 16, the former pair extending from the upper wall 10 of the license plate enclosure and the latter pair extending from the lower wall 11 of the said enclosure. Although not shown, the ordinary expedient of making an air-tight joint between the panel 14 and the continuous frame work therefor is resorted to, such as the use of putty or gaskets.

The license plate enclosure is provided with a rear pivotal door 17 and is hinged to the upper or lower wall 10 or 11, but as shown to upper wall 10, by means of a pair of hinges 18. Door 17 is provided on the inner face thereof with mounting means for a license plate 19, the said means as shown comprising two parallel and longitudinal groove members 20 and 21 soldered or brazed to the said door 17. The license plate 19 is adapted to slide along the inner surface of rear door 17 on members 20 and 21 as guides and supports.

In order to afford rear door 17 the proper support against rear edges of the upper, lower and end walls of the enclosure, angle irons 22 and 23 are provided being affixed to the upper and lower walls along the rear edges thereof. Rear door 17 is detachably secured against the enclosure by such expedient means as a pair of resilient fingers 24 projecting from the opening edge of the door 17 on the inner surface thereof and cooperating with orifices and depressions suitably made in angle iron 23 as best shown in Figure 3 of the accompanying drawings. Intermediate the length of and at the opening edge of door 17 is a cut-out portion adapted to serve as an opening for prying the rear door loose from the license plate enclosure for purposes of inserting or removing license plate 19 and for replacing or inserting an electric bulb as will hereinafter be described. The said cut-out portion is designated by numeral 25.

Intermediate the length of upper wall 10 of the license plate enclosure and projecting thereabove is a taillight chamber 26 commonly known in the art and having the magnifier 27 affixed thereto by means of any known mounting 28. Taillight chamber 26 is affixed to the license plate enclosure by any means such as spot-welding or by means of nuts and bolts. From the rear wall of the said taillight chamber 26 extends a bayonet type of socket 29 holding a pin type of bulb 30 therein. Projecting outwardly from the rear wall of the said taillight chamber are a pair of threaded and projecting studs 31 to serve as an expedient means of affixing the said taillight chamber to a bracket 32 extending from the rear mud-guard 33. A socket 34 is mounted within taillight chamber 26 and extends downwardly into the license plate chamber to hold bulb 35. Sockets 34 and 29 are electrically connected to each other all as best shown in Figure 5 of the accompanying drawings.

Figure 6 shows a modification of the taillight chamber in that the sockets 34' and 29' corresponding to sockets 34 and 29 respectively are integrally connected at right angles to each other. The electrodes 38 and 37 of the said sockets 29' and 34' physically and electrically contact each other while the complementary electrodes to complete the circuit for bulbs 30 and 35, as in the case of the structure as shown in Figure 5 of the accompanying drawings, are derived from casing 26 or the enclosure for the license plate. Casing 26 and the enclosure for the license plate, both being metallic, are in physical contact with each other at their juncture of affixation, and either one is connected to the ground of the battery circuit.

Numeral 36 represents a shade member for the bulb 35 and is adapted to scatter the light therefrom throughout the license plate surface. The said shade member as shown is merely a downwardly extending offset portion of the flange 10' intermediate the length thereof.

Thus it will be seen that a license plate enclosure structure as described serves the functions of an illuminator, a casing for the license plate, a mounting for a taillight and an auxiliary light for the rear of the automobile in case the electric bulb in the taillight chamber burns out or is in any other way prevented from functioning. It will also be seen that the license plate enclosure as shown is easily adaptable for affiliation with many of the known taillights in common use on automobiles involving only minor changes in the casing of the taillight and the wiring.

I wish it distinctly understood that minor changes and variations in the nature of the materials used, in the integration and connection of parts and the relative position thereof may all be resorted to without departing from the spirit of the invention and without departing from the scope of the appended claim.

I claim:

The combination with separate illuminating means for an automobile taillight; of separate illuminating means for a license plate, said combination comprising a metallic casing for the taillight and a metallic casing for the license plate, both casings separated by a contiguous partition wall, a twin lamp socket, mounted within the taillight casing and passing with one of its branches through said partition wall into the interior of the license plate casing, separate electrical bulbs for the taillight and the interior illumination of the license plate casing, means to screen off the latter bulb toward the outside, means to manually reach and renew it from the plate casing and parallel current conducting means for the bulbs, entering through the taillight casing and utilizing both metallic casings for a current return, substantially as shown and described.

ISAAC RAFFELSON.